United States Patent [19]

Suzuki et al.

[11] Patent Number: 5,646,841
[45] Date of Patent: Jul. 8, 1997

[54] DETERMINATION OF FULL STOP IN AN ELECTRONICALLY-CONTROLLED AUTOMATIC TRANSMISSION

[75] Inventors: Hiroshi Suzuki, Gamagori; Shinichi Matsui, Nagoya; Takahiro Yamashita, Nishio, all of Japan

[73] Assignee: Aisin AW Co., Ltd., Japan

[21] Appl. No.: 336,685

[22] Filed: Nov. 7, 1994

[30] Foreign Application Priority Data

Nov. 17, 1993 [JP] Japan .................... 5-287920

[51] Int. Cl.$^6$ .................................................. G06G 7/70
[52] U.S. Cl. ........................ 364/424.098; 364/426.01; 303/19; 303/163; 303/192; 303/146; 477/206; 477/121; 477/40; 477/486; 342/109; 342/115
[58] Field of Search ......................... 364/424.1, 424.01, 364/426.01, 426.02, 426.03, 426.04, 426.05, 461, 569, 566, 565, 551.01; 303/19–20, 163–165, 61, 68, 113, 115, 185, 192–195, 146; 340/904, 479, 464, 469, 471; 342/109, 115; 180/167, 164, 197; 192/4 A, 9; 477/186, 194, 197, 206, 1, 36–40, 68, 131; 188/5, 2 R, 4 R, 181 R

[56] References Cited

U.S. PATENT DOCUMENTS

| | | | |
|---|---|---|---|
| 3,710,385 | 1/1973 | Howard et al. | 342/109 |
| 4,212,499 | 7/1980 | Jones | 364/426.02 |
| 4,289,219 | 9/1981 | Csurgay et al. | 303/119 |
| 4,353,601 | 10/1982 | Jones | 364/426.02 |
| 4,784,020 | 11/1988 | Hamano et al. | 477/186 |
| 4,949,820 | 8/1990 | Fontaine et al. | 477/186 |
| 5,014,200 | 5/1991 | Chundrlik et al. | 364/426.04 |
| 5,113,718 | 5/1992 | Sato | 477/40 |
| 5,340,202 | 8/1994 | Day | 303/19 |

FOREIGN PATENT DOCUMENTS 60-60348  4/1985  Japan.

Primary Examiner—Kevin J. Teska
Assistant Examiner—Jacques Louis-Jacques
Attorney, Agent, or Firm—Lorusso & Loud

[57] ABSTRACT

A control system for use with an electronically-controlled automatic transmission provides for accurate determination of a full stop of a vehicle. The control system includes a device for computing the vehicle speed on the basis of a signal from a vehicle speed sensor, a device for determining whether or not the brake pedal is depressed, a device for computing deceleration from a first predetermined vehicle speed to a second predetermined, extremely low vehicle speed when the brake has been determined to be depressed, and a device for determining an estimated vehicle stop time starting with detection of the extremely low vehicle speed and ending with full stop of the vehicle, the estimated vehicle stop time corresponding to the above-computed deceleration.

9 Claims, 9 Drawing Sheets

| Deceleration (km/hr/s) | $T_{Stop}$ (s) |
|---|---|
| 20.0 | 0.1 |
| 15.0 | 0.12 |
| 10.0 | 0.2 |
| 5.0 | 0.4 |
| 3.0 | 0.67 |
| 1.0 | 2.0 |
| 0.5 | 4.0 |

DETERMINATION OF FULL STOP IN AN ELECTRONICALLY-CONTROLLED AUTOMATIC TRANSMISSION

BACKGROUND OF THE INVENTION a) Field of the Invention

This invention relates to a control system for an electronically-controlled automatic transmission, which permits determination of a full stop of a vehicle.

b) Description of the Related Art

The speed of a vehicle has heretofore been computed, on the basis of output pulses from a vehicle speed sensor, by a central processing unit (CPU) in an electronic control system. For example, using an electromagnetic pickup coil, a pulse is generated by passage of a metal-made rotor through a magnetic field produced by an electromagnetic coil. The pulse is detected as a sinusoidal wave by the vehicle sensor as shown in FIG. 8, is converted by a vehicle speed input processor into a square wave as depicted in FIG. 9, a leading edge interval $T_1$ of the square wave is detected by the central processing unit (CPU) in the electronic control system, and vehicle speed is then computed based on the leading edge interval $T_1$.

For detection of a full stop of the vehicle, on the other hand, the vehicle has been regarded to be at a full stop when the vehicle speed pulse interval T is equal to or longer than a predetermined constant time $T'_{stop}$, in other words, when the condition of $T'_{stop} \leq T$ is met.

The method for the above determination of the full stop of the vehicle is illustrated in FIG. 10 which is a flowchart for the conventional determination of the full stop of the vehicle.

(1) First, a vehicle speed pulse interval $T_1$ is detected (step S1).

(2) Next, vehicle speed is computed based on the vehicle speed pulse interval $T_1$ (step S2).

(3) Then, it is determined whether or not a detected vehicle speed pulse interval T is equal to or longer than the predetermined constant time $T'_{stop}$, in other words, satisfies $T'_{stop} \leq T$ ( step S3).

(4) Where $T'_{stop} \leq T$ is determined above, the vehicle is judged to have stopped so that vehicle-stop-time processing is performed (step S4).

Incidentally, with the shift lever in a drive position D, when a vehicle having an automatic shifting system is stopped (with the engine idling), due to a dragging torque in the torque converter, the so-called creep phenomenon causes the vehicle to move forward.

To prevent the creep phenomenon, in other words, to perform non-creep (anti-creep) control, it is necessary to precisely detect a full stop of the vehicle.

Examples of such non-creep control systems for vehicles include the control system disclosed in Japanese Patent Application Laid-Open (Kokai) No. SHO 60-60348.

Determination of a full stop of a vehicle according to the above-described conventional vehicle-stop time processing, however, is delayed by a time $T'_{stop}$ as illustrated in FIG. 12 although, as shown in FIG. 11, the vehicle has already been at a full stop at point "a" insofar as the actual vehicle speed is relied upon.

Further, the use of the so-called electromagnetic pickup coil system as a vehicle speed sensor, wherein a pulse is generated as a result of passage of the metal rotor through a magnetic field, involves the inherent problem that when the vehicle speed is very low, the detection of the vehicle speed by the vehicle speed sensor is practically impossible because no pulse is generated from the electromagnetic coil unless the speed of the rotor passing through the magnetic field is equal to or higher than a predetermined value.

Even if the results of plural pulse detecting operations are averaged as in the prior art, high-accuracy detection of a vehicle speed is impossible in a vehicle speed range close to 0.

The vehicle speed is 0 could be taken as a point at which a predetermined time has elapsed since stop of pulse generation as described above. In this case, however, the predetermined time varies depending on the manner of the stop of the vehicle, thereby making it impossible to determine a full stop of the vehicle as a point in time concurrent with the actual full stop of the vehicle.

More specifically, cessation of pulse generation precedes by a short time the actual stop of the vehicle when the vehicle is abruptly stopped. However, the discrepancy becomes longer when the vehicle is gradually stopped. If the above-described predetermined time was set constant, the determination of a stop would be delayed for an abrupt stop but, in the case of a gradual stop, the vehicle would be determined to be at a stop prior to the actual stop.

Such determination of a stop of a vehicle is important in non-creep (anti-creep) control, thus creating demand for precise detection of a full stop of the vehicle and hence accurate control of the vehicle.

SUMMARY OF THE INVENTION

With a view to overcoming the above problems, an object of the present invention is to provide a control system for an electronically-controlled automatic transmission, which can perform high-accuracy determination of a stop of a vehicle irrespective of the manner of the stop of the vehicle.

It has now been found that the above object can be achieved by adding means for detecting deceleration of the vehicle and determining stoppage of the vehicle on the basis of the deceleration.

In one aspect of the present invention, there is thus provided a control system for an electronically-controlled automatic transmission, the control system permitting determination of a full stop of a vehicle and including:

means for computing vehicle speed on the basis of a signal from a vehicle speed sensor;

means for determining whether or not the brake pedal has been depressed;

deceleration detecting means for computing deceleration between a first predetermined vehicle speed and a second, extremely low predetermined vehicle speed, when brake operation has been determined by the brake determining means; and estimated vehicle stop time setting means for determining an estimated vehicle stopping time, from detection of the second predetermined, extremely low vehicle speed to the full stop of the vehicle, the estimated vehicle stop time corresponding to the deceleration determined by the deceleration detecting means.

According to the present invention, a vehicle speed is computed on the basis of a signal from a vehicle speed sensor. When it is determined that the brake pedal is not depressed, deceleration between the first predetermined vehicle speed (for example, 10 km/hr) and the second predetermined extremely low vehicle speed (for example, 2 km/hr) is computed. Determined next is an estimated time to stop of the vehicle, which corresponds to the deceleration. Based on the estimated vehicle stop time, vehicle-stop-time processing is then performed.

Application of the vehicle-stop-time processing to anti-creep control permits high-accuracy detection of a full stop of the vehicle, thereby making it possible to perform adequate anti-creep control.

DETAILED DESCRIPTION OF THE INVENTION AND PREFERRED EMBODIMENT

Figure 1:
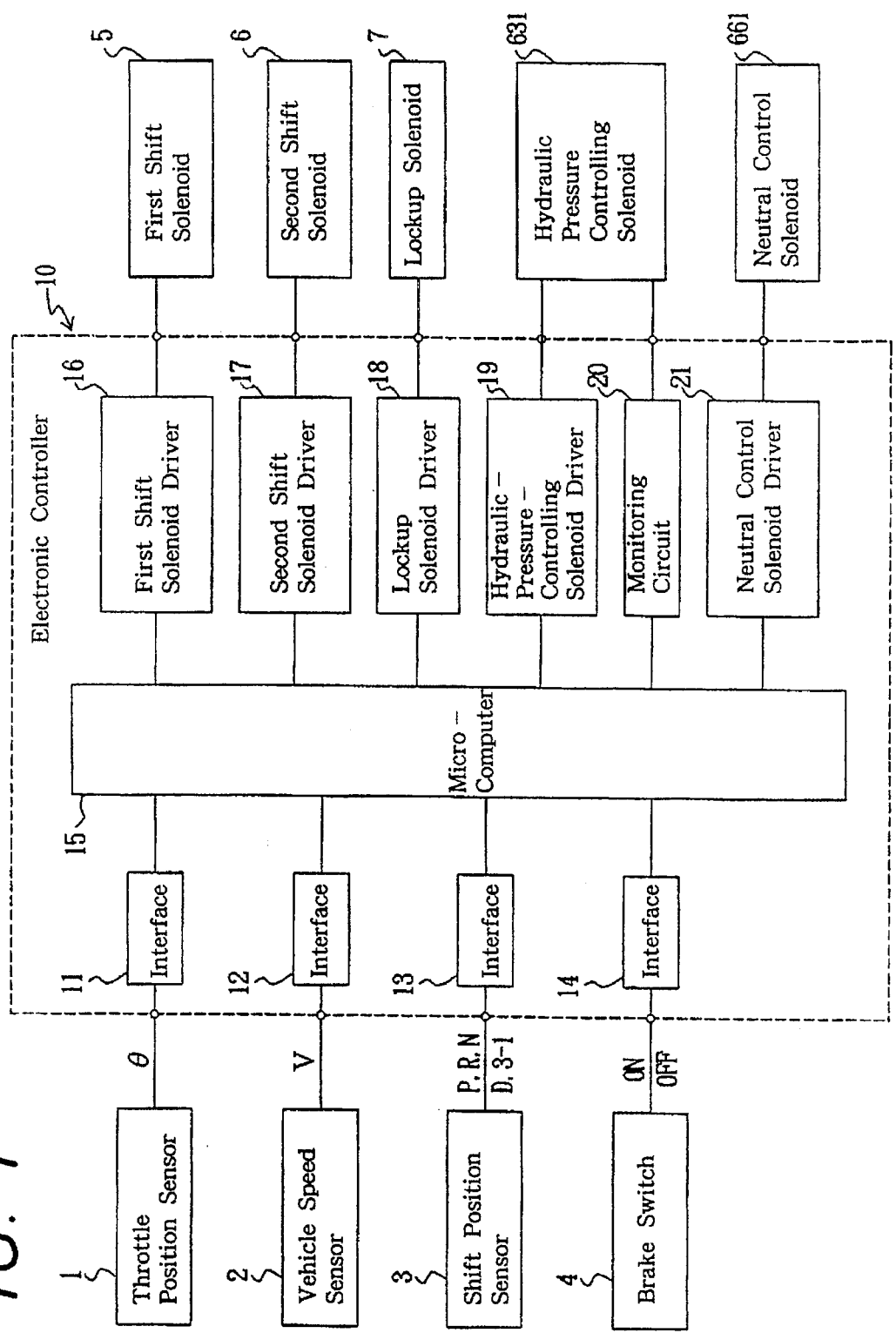
FIG. 1 is a block diagram of a control system according to one embodiment of the present invention for an electronically-controlled automatic transmission.

FIG. 1 shows a first embodiment of the present invention as including a throttle position sensor 1 for detecting the opening of a throttle valve (hereinafter called "the throttle sensor"), a vehicle speed sensor 2, a shift position sensor 3, a brake switch 4, a first shift solenoid 5, a second shift solenoid 6, a lockup solenoid 7, a hydraulic-pressure-controlling solenoid 631 and a neutral control solenoid 661. These sensors, switch and solenoids are connected to an electronic controller 10.

The electronic controller 10 is composed of interfaces 11–14, a microcomputer 15, a first shift solenoid driver 16, a second shift solenoid driver 17, a lockup solenoid driver 18, a hydraulic-pressure-controlling solenoid driver 19, a monitoring circuit 20 for the hydraulic-pressure-controlling solenoid, a neutral control solenoid driver 21, and the like.

Figure 2:
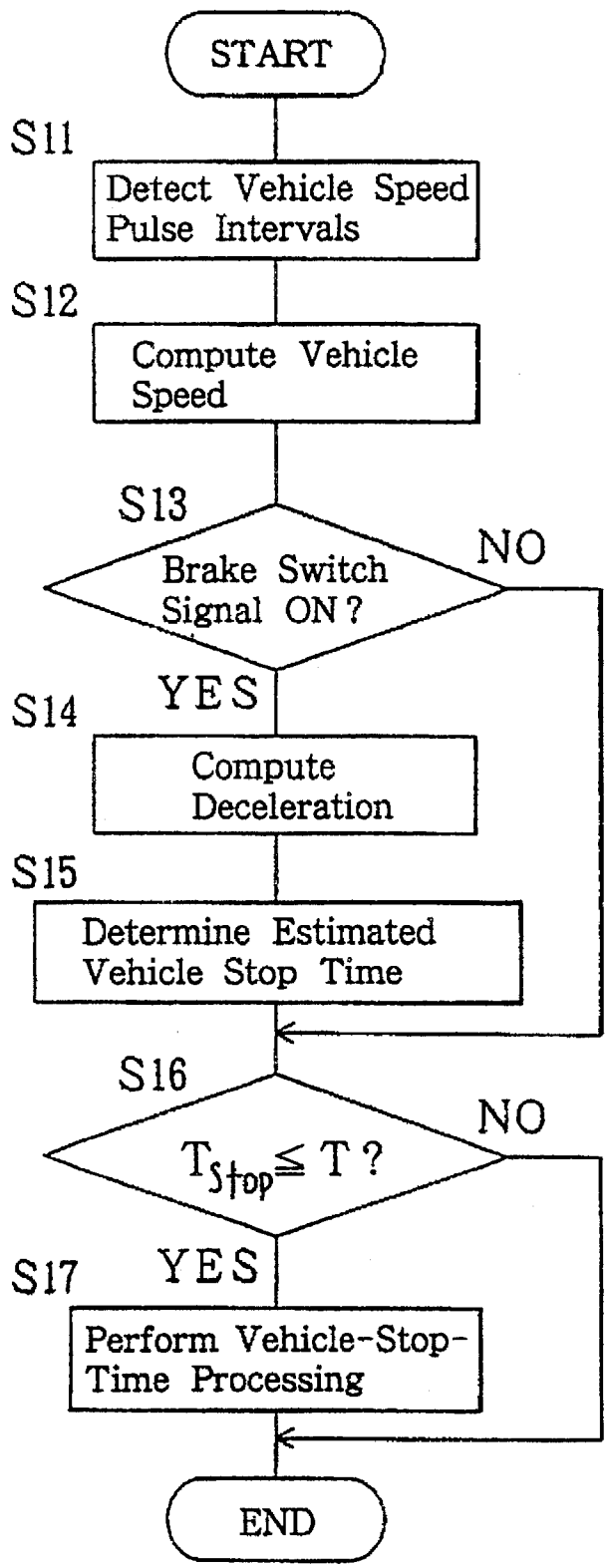
FIG. 2 is a flowchart for the determination of a stop of a vehicle by the control system of FIG. 1.

The method of determining a stop of the vehicle according to the present invention will now be described with reference to FIGS. 1 and 2.

(1) First, an interval $T_1$ of vehicle speed pulses obtained from the vehicle speed sensor 2 is detected (step S11).

(2) Next, based on the interval $T_1$ of the vehicle speed pulses, vehicle speed is computed by the microcomputer 15 (step S12). Namely, vehicle speed V=K/T (K: constant) is determined here by the periodic measuring method.

(3) It is next determined by the microcomputer 15 whether a signal from a brake switch 4 is "ON" (step S13).

(4) If the signal from the brake switch 4 is determined to be "ON", deceleration from a first predetermined vehicle speed to a second predetermined extremely low vehicle speed at which no vehicle pulses are generated is computed by the microcomputer 15 (step S14).

Figures 3, 4:
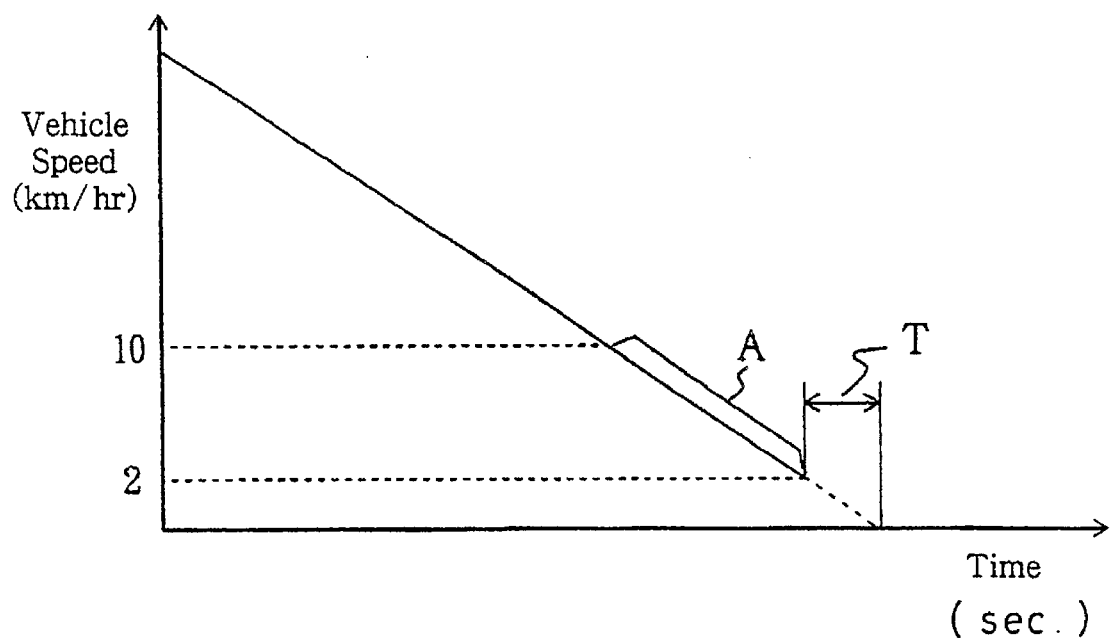
FIG. 3 is a diagrammatic illustration of determination of a stop of the vehicle by the control system of PIG. 1.
FIG. 4 is a table showing the relationship between decelerations and estimated stop times $T_{stop}$ in the determination of a stop of the vehicle by the control system of FIG. 1.

(5) In the microcomputer 15, an estimated vehicle stop time $T_{stop}$ corresponding to the computed deceleration is next determined, for example, with reference to the table of FIG. 4 stored in a memory (step S15).

(6) Similarly to the conventional art, the microcomputer 15 next determines, for example, with reference to the table of FIG. 4 stored in the memory, whether or not the estimated vehicle stop time $T_{stop}$ corresponding to the computed deceleration is shorter than the interval T of the vehicle speed pulses, namely, whether or not $T_{stop} \leq T$ (step 16).

(7) If $T_{stop} \leq T$, the vehicle is determined to be at a stop so that vehicle-stop-time processing is performed (step S17).

A specific example will now be described with reference to FIGS. 3 and 4.

As is illustrated in FIG. 3, vehicle speed is determined by the microcomputer 15 on the basis of signals from the vehicle speed sensor 2. When the vehicle speed reaches, for example, 10 km/hour, deceleration of the vehicle from the vehicle speed of 10 km/hour to an extremely low vehicle speed at which no vehicle speed pulses are generated, for example, 2 km/hour is determined by the microcomputer 15.

Where the deceleration of the vehicle is rapid, for example, 20 km/hr/s, an estimated vehicle stop time $T_{stop}$ corresponding to the vehicle deceleration of 20 km/hr/s, i.e., 0.1 second is obtained.

Where the deceleration of the vehicle is gradual, for example, 0.5 km/hr/s, an estimated vehicle stop time $T_{stop}$ corresponding to the vehicle deceleration of 0.5 km/hr/s, that is, 4.0 seconds, is obtained.

As has been described above, when a signal from the brake switch 4 is "ON", the deceleration between the predetermined vehicle speed (10 km/hr) and the extremely low vehicle speed (2 km/hr), at which no vehicle speed pulses are generated, is computed. An estimated vehicle stop time $T_{stop}$ corresponding to the deceleration is then obtained. Vehicle-stop-time processing is thereafter performed based on the estimated vehicle stop time $T_{stop}$. Specifically, the estimated vehicle stop time $T_{stop}$ is set short when the deceleration is fast but is set long when the deceleration is slow.

Figure 5:
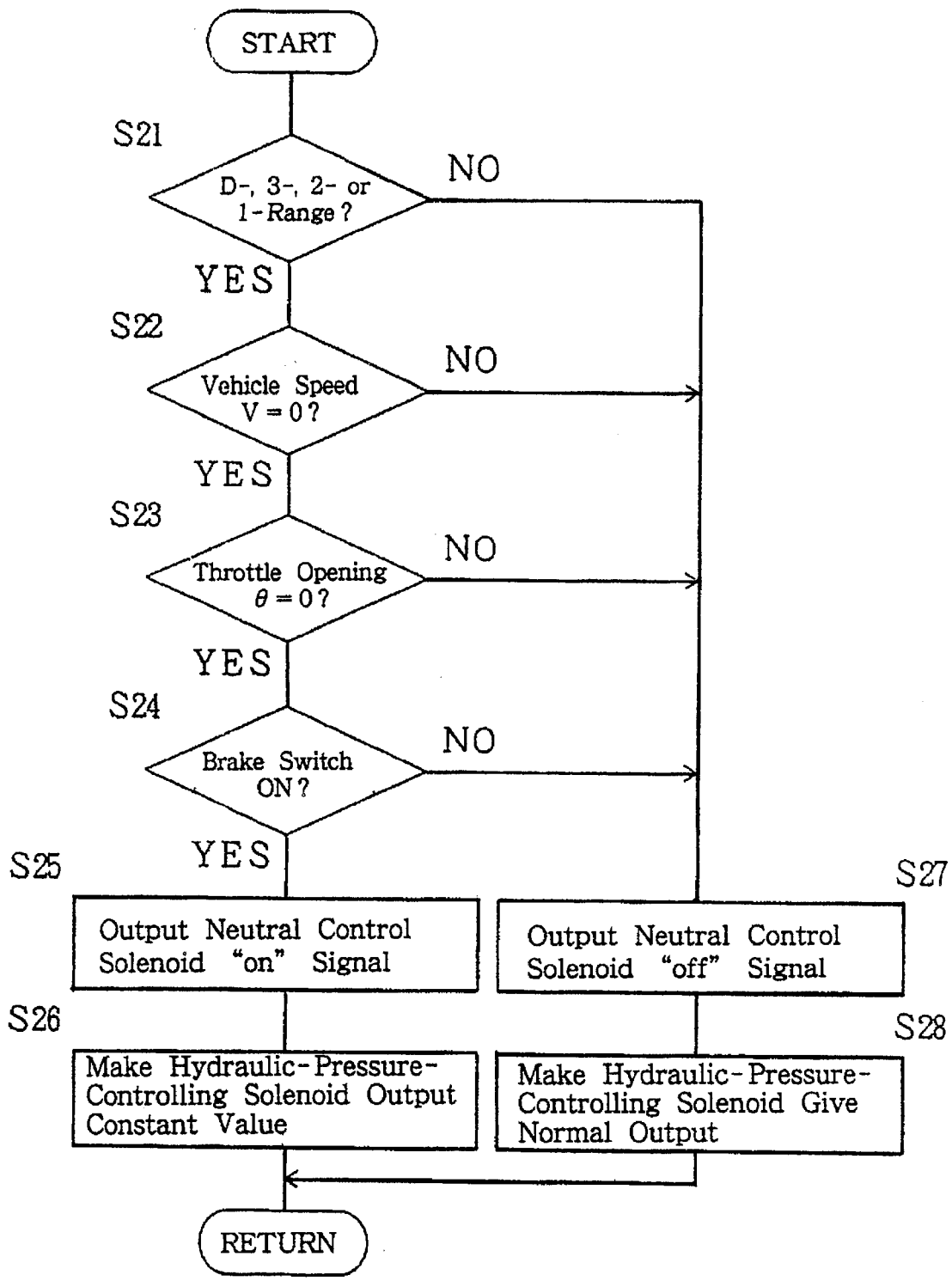
FIG. 5 is a flowchart of anti-creep control to which the present invention can be applied.

A method for anti-creep control involving such a vehicle stop determination method will be described with reference to FIGS. 5 and 1.

(1) First, based on a signal from the shift position switch 3, a determination is made of the range in which the automatic transmission is operating, i.e. the D range, the 3rd range, the 2nd range or the 1st range (step S21).

(2) If the automatic transmission is determined to be in the D range, the 3rd range, the 2nd range or the 1st range, it is then determined by the above-described method of this invention whether the vehicle is at a full stop (step S22).

(3) If the vehicle is determined to be at a full stop, it is then determined, based on a signal from the throttle sensor 1, whether the throttle valve is fully closed, in other words, whether the engine is idling (step S23).

(4) If the throttle is found to be fully closed, it is determined on the basis of a signal from the brake switch 4 whether the brake switch 4 is "ON" (step S24).

(5) If the brake switch 4 is determined to be "ON", the neutral control solenoid 661 is energized (step S25) so that the hydraulic-pressure-controlling solenoid 631 outputs a constant value (step S26).

(6) If the automatic transmission is not in the D range, the 3rd range, the 2nd range or the 1st range (step S21), if the vehicle is not at a full stop (step S22), if the throttle valve is not fully closed (step 23) or if the brake switch 4 is not "ON" (step S24), the neutral control solenoid 661 is deenergized (step S27) so that the hydraulic pressure control solenoid 631 gives an ordinary output (step S28).

A specific example of the anti-creep control will be described next with reference to FIGS. 6 and 7.

Figure 6:
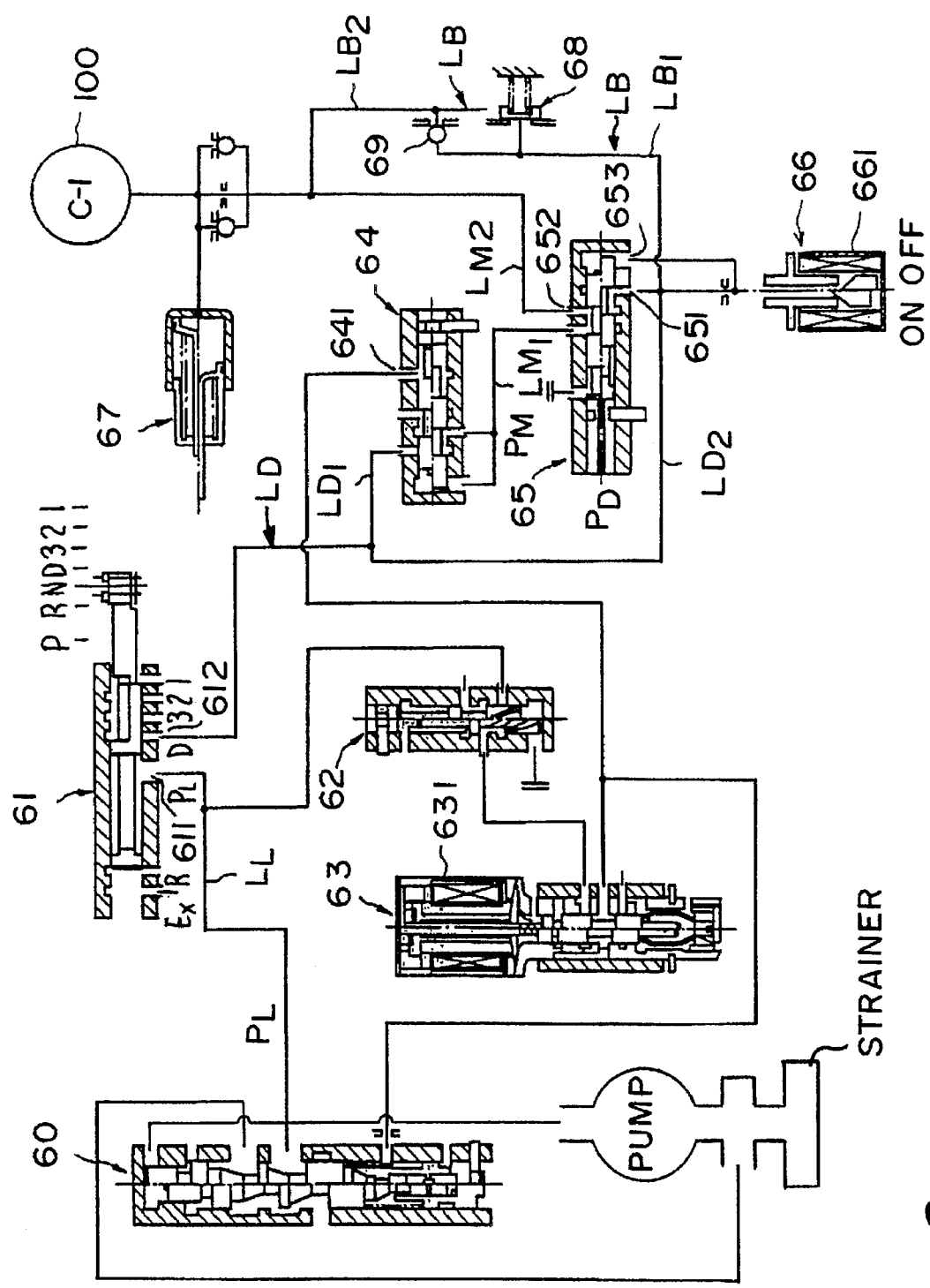
FIG. 6 is a hydraulic circuit for a anti-creep control system to which the present invention can be applied.
Figure 7:
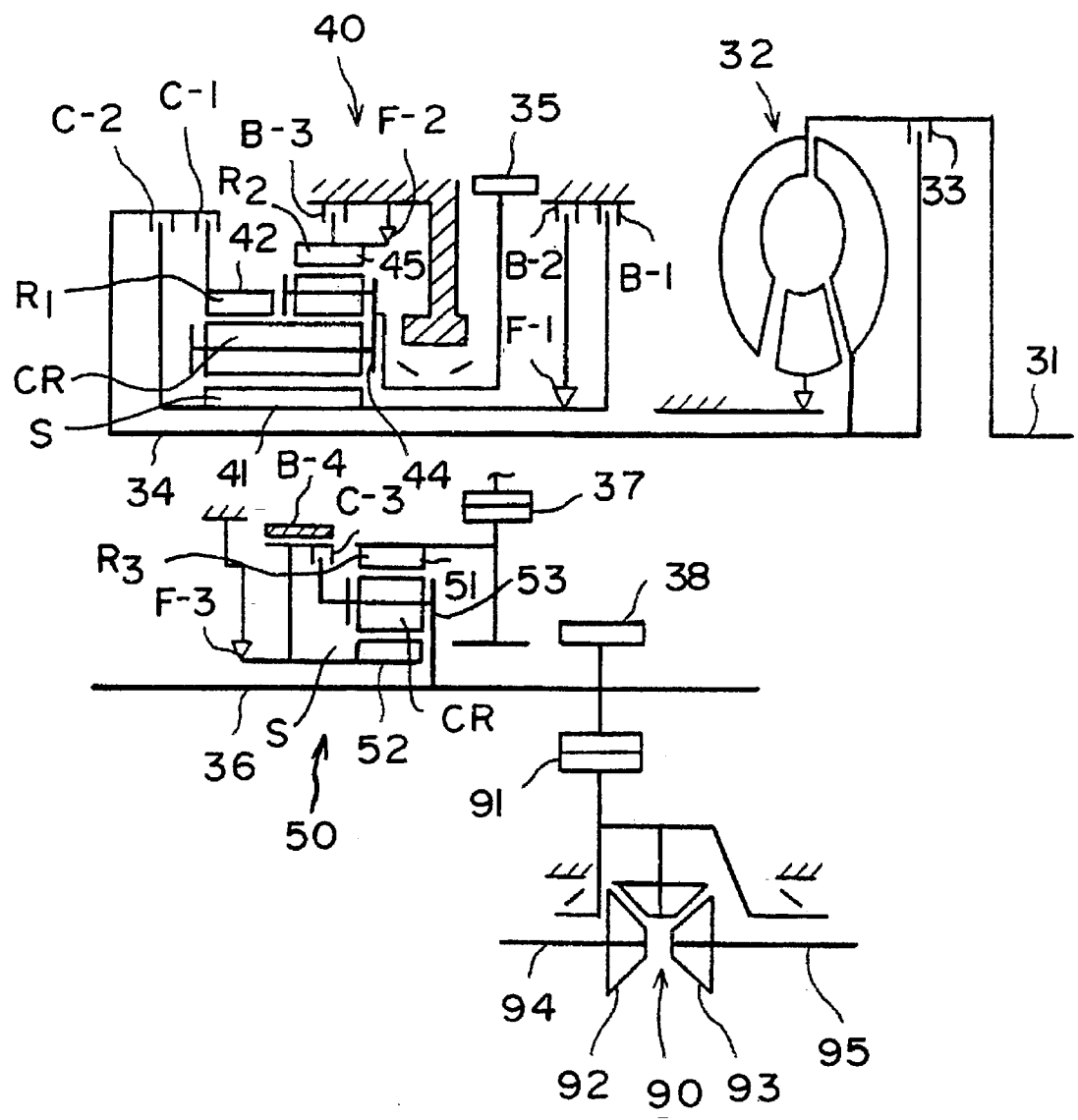
FIG. 7 is a skeletal diagram of the power transmission train of an automatic transmission to which the present invention can be applied.
Figure 8:
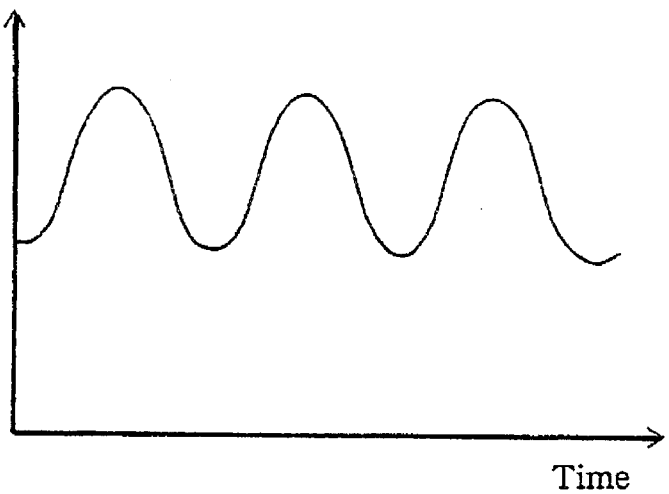
FIG. 8 is a waveform diagram of an output from a vehicle speed sensor.
Figure 9:
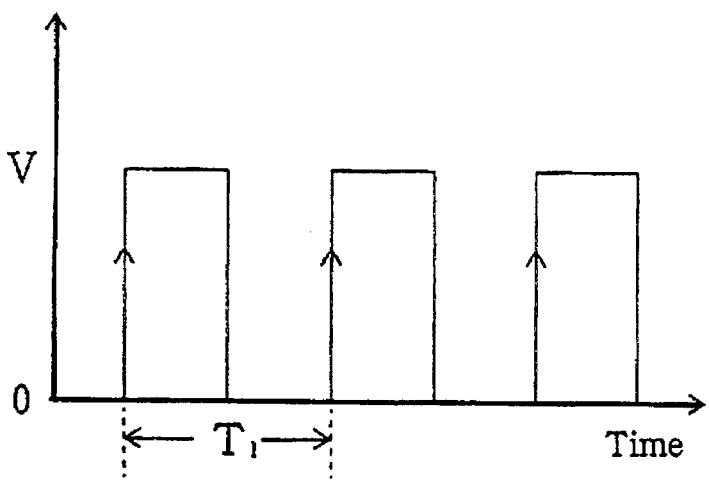
FIG. 9 is a waveform diagram of the reshaped output from the vehicle speed sensor.
Figure 10:
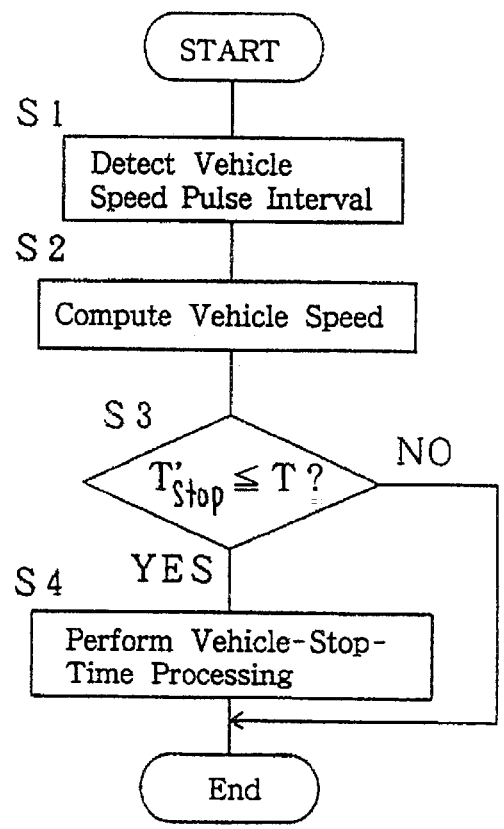
FIG. 10 is a flowchart for conventional vehicle-stop-time processing.
Figure 11:
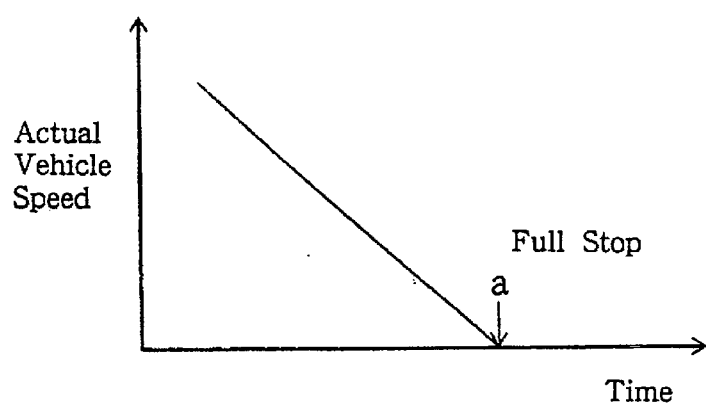
FIG. 11 is a graph of an exemplary actual stop of a vehicle.
Figure 12:
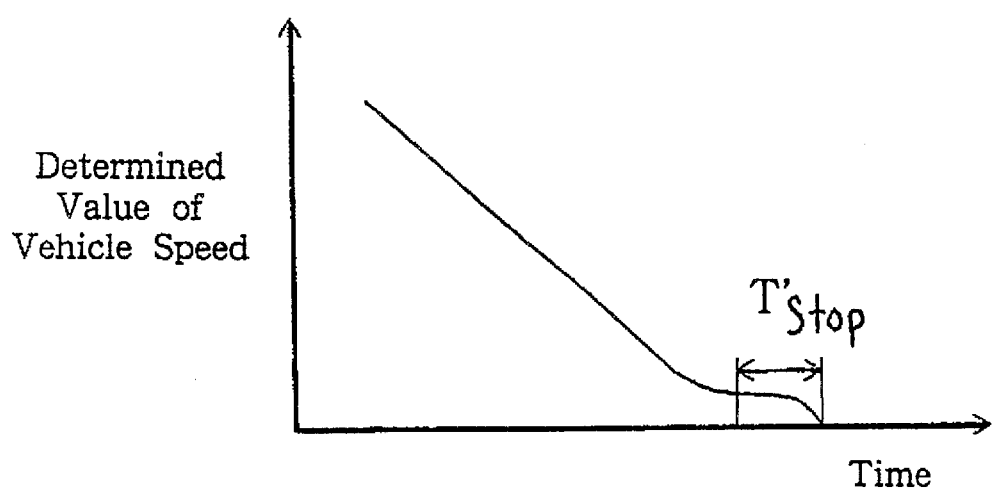
FIG. 12 is a graph of a conventionally determined stop of a vehicle.

The hydraulic circuit of the control system for control of the automatic transmission is shown in FIG. 6. The hydraulic circuit is located in the transfer axle and is shown in FIG. 6 as including a regulator valve (in the illustrated example, a primary regulator valve) 60 for outputting a hydraulic pressure corresponding to throttle opening, i.e., a line pressure $P_L$, and a manual valve 61 for feeding the line pressure $P_L$, from the regulator valve 60, as a D-range pressure $P_D$, to a hydraulic servomotor 100 for an input clutch C-1, upon shift to an advancing range [in the illustrated example, drive (D) range]. A line $L_D$ connects the manual valve 61 and the hydraulic servomotor 100. A control valve (in the illustrated example, a C1 modulator valve 64 and a neutral control valve 65), in the line $L_D$, regulates the D-range pressure $P_D$, received from the manual valve 61, to produce a modulated pressure $P_M$ so that creep is prevented while the vehicle is at a stop.

The hydraulic control circuit also includes a bypass line $L_B$ connecting the manual valve 51 and the hydraulic servomotor 100, bypassing the C1 modulator valve 64 and the neutral control valve 65. An on/off means (in the illustrated example, a bypass valve opened or closed in response to a pressure in the bypass line $L_{B1}$ against the load of a spring), arranged in the bypass line $L_B$, responds to an increase in the D-range pressure $P_D$ to bring the bypass lines $L_{B1}$ and $L_{B2}$ into communication.

Individual portions of the hydraulic circuit for the control system, which is the neutral control of the automatic transmission, will now be described in detail.

The illustrated hydraulic circuit is part of the hydraulic pressure control system which controls individual clutches and brakes and a lockup clutch in the transfer axle. The primary regulator valve 60 functions as a regulator valve, and responds to a signal pressure corresponding to a throttle opening output from a hydraulic-pressure-controlling solenoid valve 63 (to be described subsequently herein) to output a line pressure $P_L$ to the manual valve 61 via a line $L_L$, while discharging a pump delivery pressure to a drain port and/or an unillustrated secondary regulator valve, as needed.

The manual valve 61 functions as a directional control valve and receives the line pressure $P_L$ and, upon a shift in range (by an unillustrated shift device), outputs the line pressure as a corresponding range pressure through the appropriate port D, 3, 2, 1 or R. Connected to the line LL extending between the primary regulator valve 60 and the manual valve 61 is the hydraulic-pressure-controlling solenoid valve 63 which, receives, as a base pressure, the modulated line pressure $P_L$ from the modulator valve 62 and outputs a signal pressure to a signal port of the primary regulator valve 60 and a signal port 641 of the C1 modulator valve 64. It is the C1 modulator valve 64 that feeds the D-range pressure $P_D$ to the neutral control valve 65 via a line $L_{N1}$ in response to the signal pressure.

The neutral control valve 65, which serves as a directional control valve, feeds the modulated pressure $P_M$ from the line $L_{M1}$ to the hydraulic servomotor 100 for the input clutch C-1 via a line $L_{M2}$ and also feeds the D-range pressure $P_D$, received through a line $L_{D2}$, to the hydraulic servomotor 100 via the line $L_{M2}$, by-passing the C1 modulator valve 64.

A change-over of the neutral control valve 65 is effected by supplying the signal pressure, which uses the D-range pressure $P_D$ in the line $L_{D2}$ as a base pressure, to a signal port 653 of the neutral control valve 65 by turning on or off a neutral control solenoid valve 66. In the figure, numeral 67 indicates an accumulator for the input clutch C-1, and numeral 69 designates a check valve which assures drainage of working oil from the hydraulic servomotor 100 without passing through the neutral control valve 65 or the C1 modulator valve 64.

A bypass valve 68 is in the form of a spring-loaded, direct-acting, pressure-responsive valve in the illustrated embodiment. The spring load is set so that the bypass valve 68 can be opened by a pressure higher than at least the line pressure $P_L$, as output from the primary regulator valve 60, when the accelerator pedal is at a released position. In other words, the D-range pressure is output via D-range port 612 of the manual valve 61. Accordingly, release of anti-creep control is responsive to a depression of the accelerator pedal and becomes faster as the spring load is set closer to the D-range pressure $P_D$.

As is illustrated in FIG. 1, the electronic controller 10, which controls both the solenoids 631, 661 of the hydraulic-pressure-controlling solenoid valve 63 and the neutral control solenoid valve 66 in the above-described hydraulic circuit, receives inputs from the shift position switch 3, the vehicle speed sensor 2 (arranged adjacent an output shaft of the automatic transmission), a throttle sensor 1 disposed as an accessory to the engine and the brake switch mounted on the vehicle body. The electronic controller, in turn, outputs control signals, which have been processed by the microcomputer 15, to the neutral control solenoid 661 and the hydraulic-pressure-controlling solenoid 631, respectively. The shift position switch 3 generally takes the form of a neutral start switch located in the shifting device and detects the position of the manual valve 61.

Control of the input clutch C-1 in the transfer axle constructed as described above is performed in accordance with the processing described above with reference to FIG. 5.

When the control is started, a range is first selected in step S21 based on a position signal from the shift position switch 3. The controller 10 then selects the neutral control scheme appropriate for the selected range D, 3, 2 or 1.

Therefore, in idling in each of these ranges, the output from the vehicle speed sensor 2 in step S22 is approximately 0 (V=0) and the output from the throttle sensor 1 in step S23 is 0 (θ=0), and, by the control of the hydraulic control system, each hydraulic servomotor is brought into a first speed state. The torque of the engine at idling is input, as shown in FIG. 7, to a ring gear 42 by way of an input shaft 31, a torque converter 32, an input shaft 34, and the input clutch C-1 which is in an engaged state. Owing to a reaction force on ring gear 45 produced as a result of an engagement of a one-way clutch F-2, the engine torque is transmitted as rotation of a carrier 44 to a ring gear 51 of a secondary shifting unit 50 via both counter gears. A reaction force is then produced by braking a sun gear 52 by engagement of a brake B-4, which reaction force is output as rotation of carrier 53 and is thereafter transmitted to both axles 94, 95 via a differential unit 90.

At this time, the D-range port 612 of the manual valve 61 is in communication with a line pressure port 611 in the hydraulic circuit depicted in FIG. 6. The line pressure $P_L$ is therefore output as the D-range pressure $P_D$ from the D-range port 612 to the line $L_D$ and then fed from the line $L_{D1}$ to the C1 modulator valve 64.

At this time, the hydraulic-pressure-controlling solenoid valve 63 is usually set at an output n and an output signal of the hydraulic-pressure-controlling solenoid valve 63 is received at the port 641 of the C1 modulator valve 64, as described above. The D-range pressure $P_D$, therefore, is fed through the C1 modulator valve 64, which takes the position shown in its lower half portion in the figure, more precisely, a position somewhat displaced rightward (as viewed in the figure) as a result of application of a secondary pressure in the opposite direction as will be described subsequently herein. By feed-back of the secondary pressure, the D-range pressure $P_D$ is regulated by C1 modulator valve 64 to the modulated pressure $P_M$, which is received by the neutral control valve 65 via the line $L_{M1}$. The modulated pressure $P_M$ is however blocked from entering the neutral control valve 65 when no signal is received from the neutral control solenoid valve 66, i.e. when the neutral control solenoid valve 66 is turned off, with the neutral control valve 65 in the position shown in its lower half portion in the figure.

Accordingly, the D-range pressure $P_D$ enters a port 651 of the neutral control valve 65 via the lime $L_{D2}$ and is then fed, as is, to the hydraulic servomotor 100 for the clutch C-1 via the line $L_{M2}$ from a port 652 of the neutral control valve 65.

If the brake pedal is depressed in this state and the brake switch 4 is turned on, the vehicle speed as detected by the vehicle speed sensor 2 in step S22 becomes 0 (V=0) so that conditions for the neutral control are all met. From the microcomputer 15, a neutral control solenoid "ON" signal is output in step S25, and in step S26, the hydraulic-pressure-controlling solenoid therefore outputs the constant value k (the duty ratio of a drive current is set at a predetermined value). The so-called neutral control is accordingly started to achieve an anti-creep control.

At the time of the neutral control described above, a signal pressure, changed responsive to a change in the constant value k output from the hydraulic-pressure-controlling solenoid valve 63, is received at port 641 of the C1 modulator valve 64, so that the D-range pressure $P_D$ which has been fed to the C1 modulator valve 64 up to that time is changed by the C1 modulator valve 64 to the modulated pressure $P_M$ suited for the neutral control. This modulated pressure $P_M$ then enters the neutral control valve 65 via the line $L_{M1}$ and, upon application of a signal pressure as a result of closure of the neutral control solenoid valve 66, is fed to the hydraulic servomotor 100 for the input clutch C-1 from the line $L_{M2}$ by way of the neutral control valve 65 which has been switched to its upper half position shown in the figure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for determination of a full stop of a vehicle, equipped with an electronically-controlled automatic transmission, the control system comprising:

means for computing vehicle speed on the basis of a signal from a vehicle speed sensor;

brake detection means for determining depression of a brake pedal and for generation of a brake signal;

deceleration detecting means for computing, responsive to a brake signal, rate of deceleration between a first predetermined vehicle speed and a second predetermined vehicle speed significantly lower than said first predetermined vehicle speed; and estimated vehicle stop time setting means for determining an estimated vehicle stop time, from detection of said second vehicle speed to full stop of the vehicle, said estimated vehicle stop time corresponding to said deceleration rate determined by said deceleration detecting means, for decreasing said estimated vehicle stop time as said deceleration rate increases and for increasing said estimated vehicle stop time as said deceleration rate decreases.

2. A control system according to claim 1, wherein said extremely low vehicle speed is that speed where said vehicle speed sensor ceases outputting a signal.

3. A control system according to claim 1, wherein said first predetermined vehicle speed is approximately 10 km/hr and said second predetermined vehicle speed is approximately 2 km/hr.

4. A control system according to claim 1, wherein said brake detection means is a brake switch.

5. A control system according to claim 1, wherein said vehicle speed computing means detects an interval between vehicle speed pulses obtained from said vehicle speed sensor and then determines a vehicle speed on the basis of said detected interval.

6. A control system according to claim 5, further comprising a comparator for determining whether or not said estimated vehicle stop time is shorter than a time calculated from said detected interval.

7. A control system according to claim 6, wherein said vehicle is determined to have stopped when said estimated vehicle stop time is shorter than the time calculated from said interval.

8. A control system according to claim 1, further comprising means for detecting throttle opening and wherein said deceleration means responds to said brake signal only when the throttle opening has been detected to be 0%.

9. A control system according to claim 1, further comprising means for preventing creep responsive to said estimated vehicle stop time.

* * * * *

UNITED STATES PATENT AND TRADEMARK OFFICE
CERTIFICATE OF CORRECTION

PATENT NO. : 5,646,841
DATED      : July 8, 1998
INVENTOR(S) : SUZUKI et al

It is certified that error appears in the above-indentified patent and that said Letters Patent is hereby corrected as shown below:

Col. 3, line 17, "PIG" should read --FIG--.

Col. 5, line 67, "$L_N$" should read --$L_M$--.

Signed and Sealed this

Twenty-third Day of June, 1998

*Attest:*

BRUCE LEHMAN

*Attesting Officer*  Commissioner of Patents and Trademarks